United States Patent
Braun et al.

(10) Patent No.: US 8,876,119 B2
(45) Date of Patent: Nov. 4, 2014

(54) GROMMET AND SEAL ASSEMBLY FOR COOLING PIPES PASSING THROUGH SOUND WALL

(75) Inventors: Michael J. Braun, Peoria, IL (US); Jessica Boldt, Glendale Heights, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 13/603,010

(22) Filed: Sep. 4, 2012

(65) Prior Publication Data

US 2014/0060947 A1    Mar. 6, 2014

(51) Int. Cl.
| | |
|---|---|
| *E02F 9/08* | (2006.01) |
| *B60R 13/08* | (2006.01) |
| *B60K 11/00* | (2006.01) |
| *B23P 11/00* | (2006.01) |

(52) U.S. Cl.
CPC .......... *E02F 9/0866* (2013.01); *B60R 13/0838* (2013.01); *B60K 11/00* (2013.01); *B23P 11/00* (2013.01)
USPC .......... 277/616; 248/68.1; 180/69.22

(58) Field of Classification Search
CPC .......... F16L 3/237; B60K 11/04; B60K 11/08
USPC .......... 180/69.22, 68.1; 248/74.1, 74.4, 68.1; 181/295, 284, 224; 454/906; 16/2.1; 277/602, 606, 607, 608, 616, 625; 165/67
See application file for complete search history.

(56) References Cited

U.S. PATENT DOCUMENTS

| | | | | |
|---|---|---|---|---|
| 3,515,416 | A * | 6/1970 | Pickert | 285/413 |
| 4,086,976 | A * | 5/1978 | Holm et al. | 180/68.1 |
| 4,321,726 | A * | 3/1982 | Rogers et al. | 16/2.1 |
| 4,572,327 | A * | 2/1986 | Dean | 181/295 |
| 4,622,436 | A * | 11/1986 | Kinnan | 174/77 R |
| 4,712,370 | A | 12/1987 | MacGee | |
| 4,758,028 | A * | 7/1988 | Davies et al. | 285/189 |
| 5,575,349 | A * | 11/1996 | Ikeda et al. | 180/68.1 |
| 5,836,212 | A * | 11/1998 | Bates | 74/502.6 |
| 6,302,066 | B1 | 10/2001 | Steinmann | |
| 6,457,542 | B1 * | 10/2002 | Hosono et al. | 180/68.1 |
| 7,534,965 | B1 * | 5/2009 | Thompson | 174/153 G |
| 7,568,314 | B2 * | 8/2009 | Collins | 52/60 |
| 8,572,806 | B2 * | 11/2013 | Iwahara et al. | 16/2.1 |
| 2006/0249636 | A1 * | 11/2006 | Thiedig et al. | 248/74.4 |
| 2012/0048631 | A1 | 3/2012 | Shatters et al. | |

FOREIGN PATENT DOCUMENTS

| | | |
|---|---|---|
| DE | 100 42 143 A1 | 8/2000 |
| GB | 2 221 736 A | 10/1988 |

* cited by examiner

*Primary Examiner* — John Walters
*Assistant Examiner* — Brian Swenson
(74) *Attorney, Agent, or Firm* — Miller, Matthias & Hull

(57) ABSTRACT

A grommet and seal assembly enables a pair of ducts to pass through a sound wall that separates an engine from a cooling system. The disclosed grommet and seal assembly enables the sound wall to flex without breaking the seal between the grommets and the air ducts. The grommet and seal assembly may include a pair of flexible grommets which are installed in openings in the sound wall and through which the air ducts are installed. Rigid proximal and distal plates may then be coupled together so that the flexible grommets are sandwiched between the proximal and distal plates. Each flexible grommet may include dual flanges and all four flanges may be sandwiched between the proximal and distal plates after the proximal and distal plates are coupled together. A center plate may also be included between the flanges and between the proximal and distal plates for additional structural integrity.

20 Claims, 4 Drawing Sheets

GROMMET AND SEAL ASSEMBLY FOR COOLING PIPES PASSING THROUGH SOUND WALL

TECHNICAL FIELD

This disclosure relates generally to a sound wall for providing sound insulation for an engine and cooling system for the engine. More specifically, this disclosure relates to a sound wall disposed between an engine and a cooling system that includes a pair of cooling ducts that sealably pass through a sound wall equipped with a disclosed grommet and seal assembly.

BACKGROUND

Various types of machines are used for moving earth and other types of work. Such machines typically have an attached implement such as a bucket, a blade or other implements used for material handling. Typically, such machines may be configured to perform various work cycles. For example, a track type loader or a wheel type loader typically has a bucket which may be configured to perform a work cycle that includes digging, collecting (racking) a load, carrying a load, and/or dumping a load. Generally, such machines have a frame and the implement is connected to the frame by a linkage. As the machine performs a work cycle, various portions of the implement and linkage may be operated as the machine is propelled across the ground. Most of these functions apply a load on the engine, thereby increasing the heat generated by the engine.

Internal combustion engines and associated cooling systems, particularly the fan associated with such cooling systems, tend to be relatively noisy. Governmental bodies in many countries are continuously striving to require engine and vehicle manufacturers to reduce the noise output of their products. Manufacturers also desire to reduce the noise level in order to provide operators and bystanders with a more comfortable atmosphere. One step in reducing noise is to provide separate enclosures for the engine and the cooling system.

Additional noise reduction of engine cooling air systems can be achieved by insulating the area of the cooling system enclosure near the fan and radiator with a sound absorbing material, including the use of a "sound wall" disposed between the cooling system and engine enclosures. When the fan is operating, it draws ambient air into the cooling system enclosure and across the radiator and creates a pressure drop across the cooling system enclosure. Without the sound wall, hot air from the engine enclosure would be free to pass across the radiator in competition with the ambient air being drawn into the cooling system enclosure by the fan, which would reduce the efficiency of the cooling system. Thus, in addition to sound insulation, the sound wall may also be designed to limit or prevent hot air from the engine enclosure from passing across the radiator.

However, there is often a need to pass cooling air or exhaust air between the engine and cooling system enclosures and through the sound wall via air ducts. For example, the air ducts may be part of an input or an output to the turbocharger system of the engine. When the fan is operating, the pressure drop across the cooling system enclosure caused by the fan can cause the sound wall to move, which permits hot air from the engine enclosure to pass through the openings in the sound wall that accommodate the air ducts. As a result, a seal is needed between the sound wall and the air ducts because it is undesirable to permit hot air from the engine enclosure to be drawn across the radiator as opposed to ambient air being drawn across the radiator by the fan. While sound walls with grommets through which the air ducts pass are known, currently available grommets can lose contact with the sound wall if the sound wall moves or flexes. As a result, hot air from the engine enclosure can still be drawn across the radiator, which reduces the efficiency of the cooling system.

Accordingly, there is a need for a seal between the air ducts and the sound wall which permits the sound wall to flex or move without permitting air from the engine enclosure to pass through the sound wall and across the radiator, which would adversely impact the efficiency of the cooling system.

SUMMARY OF THE DISCLOSURE

In a refinement, a sound attenuation system is disclosed. The disclosed sound attenuation system may include a sound wall with a first opening that may be disposed adjacent to, but spaced apart from a second opening. The first opening may accommodate a first duct and a first grommet. The second opening may accommodate a second duct and a second grommet. The first grommet may include a first cylindrical section that passes through the first opening and that may accommodate the first duct. The first cylindrical section may include a proximal end that may be connected or coupled to a proximal flange. The first cylindrical section may further include a distal end that may be connected or coupled to a distal flange and the sound wall may be disposed between the proximal and distal flanges of the first grommet. The second grommet may similarly include a second cylindrical section that may pass through the second opening and that may accommodate the second duct. The second cylindrical section may include a proximal end that may be connected to or coupled to a proximal flange as well as a distal end that may be connected to or coupled to a distal flange. The sound wall may be disposed between the proximal and distal flanges of the second grommet as well. The proximal flange of the first grommet may include a proximal side edge that may be disposed between the first and second openings. The proximal flange of the second grommet may also include a proximal side edge that may also be disposed between the first and second openings and that may also abut the proximal side edge of the first grommet. Similarly, the distal flange of the first grommet may include a distal side edge that may be disposed between the first and second openings. The distal flange of the second grommet may also include a distal side edge that may be disposed between the first and second openings and that also abuts the distal side edge of the first grommet. The proximal side edges of the first and second grommets may be disposed between the sound wall and a proximal plate. The distal side edges of the first and second grommets may similarly be disposed between the sound wall and a distal plate. The proximal and distal plates may be coupled together with the proximal side edges, distal side edges and sound wall sandwiched therebetween.

In another refinement, a reinforcing grommet and a grommet and seal assembly is disclosed. The reinforcing grommet supports a pair of flexible grommets disposed adjacent to, but spaced apart from each other. The flexible grommets may each include proximal and distal flanges. The proximal flanges may each include proximal side edges that abuttingly engage each other and the distal flanges may each include distal side edges that abuttingly engage each other at a position offset from the proximal side edges. The reinforcing grommet may include a proximal plate for overlying the proximal side edges and a distal plate for overlying the distal side edges and at least one fastener connecting the proximal plate to the distal plate with the proximal side edges and distal side edges of the flexible grommets disposed therebetween.

In yet another refinement, a method for passing air through a sound wall that divides a first enclosure from a second enclosure is disclosed. The air passes through the sound wall via first and second air ducts that may pass through first and second openings in the sound wall without permitting air to pass between the first and second enclosures through the first and second openings and outside of the first and second air ducts. The disclosed method may include installing a first grommet in the first opening and passing the first duct through the first grommet. The first grommet may include a first cylindrical section that passes through the first opening and that accommodates the first duct. The first cylindrical section may include a proximal end connected to a proximal flange. The first cylindrical section may further include a distal end connected to a distal flange with the sound wall disposed between the proximal and distal flanges of the first grommet. The proximal flange of the first grommet may also include a proximal side edge disposed between the first and second openings. The distal flange of the first grommet may also include a distal side edge disposed between the first and second openings. The method may further include installing a second grommet in the second opening and passing the second duct through the second grommet. The second grommet may include a second cylindrical section that passes through the second opening and that may accommodate the second duct. The second cylindrical section may include a proximal end that may be connected to or coupled to a proximal flange as well as a distal end that may be connected to or coupled to a distal flange with the sound wall disposed between the proximal and distal flanges of the second grommet. The proximal flange of the second grommet may also include a proximal side edge disposed between the first and second openings and that abuts the proximal side edge of the first grommet. The distal flange of the second grommet may also include a distal side edge disposed between the first and second openings and that may also abut the distal side edge of the first grommet. The disclosed method further includes placing a proximal plate over the proximal side edges of the first and second grommets so the proximal side edges are disposed between the sound wall and the proximal plate. The disclosed method may further include placing a distal plate over the distal side edges of the first and second grommets so the distal side edges may be disposed between the sound wall and the distal plate. The disclosed method may further include coupling the proximal and distal plates together with the proximal side edges, distal side edges and sound wall sandwiched between the proximal and distal plates.

DETAILED DESCRIPTION

Figure 1:
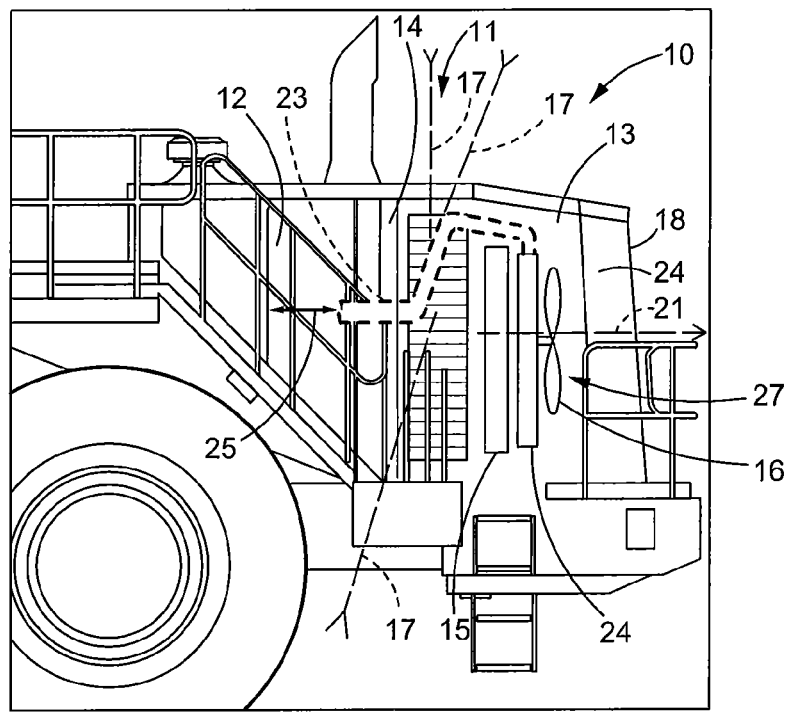
FIG. 1 is a side and schematic view of a cooling system enclosure and an engine enclosure of a machine with a sound wall disposed between the cooling system and engine enclosures and further illustrating communication of air between the engine enclosure and cooling system enclosure through air ducts that pass through the sound wall.

FIG. 1 shows a partial view of a machine 10 that may include an attached implement (not shown). The machine 10 may include a ventilation system 11 for an engine enclosure 12 that is disposed adjacent to a cooling system enclosure 13 with a sound wall 14 separating the engine enclosure 12 from the cooling system enclosure 13. The cooling system enclosure may house a radiator 15 and a fan 16. As the fan 16 is rotated, it may create a pressure drop across the cooling system enclosure 13 and, as a result, draws ambient air across the radiator 15 from various directions as indicated schematically by the phantom lines 17. The air may be expelled out through a rear end 18 of the machine 10 as indicated schematically by the phantom line 21.

Figure 2:
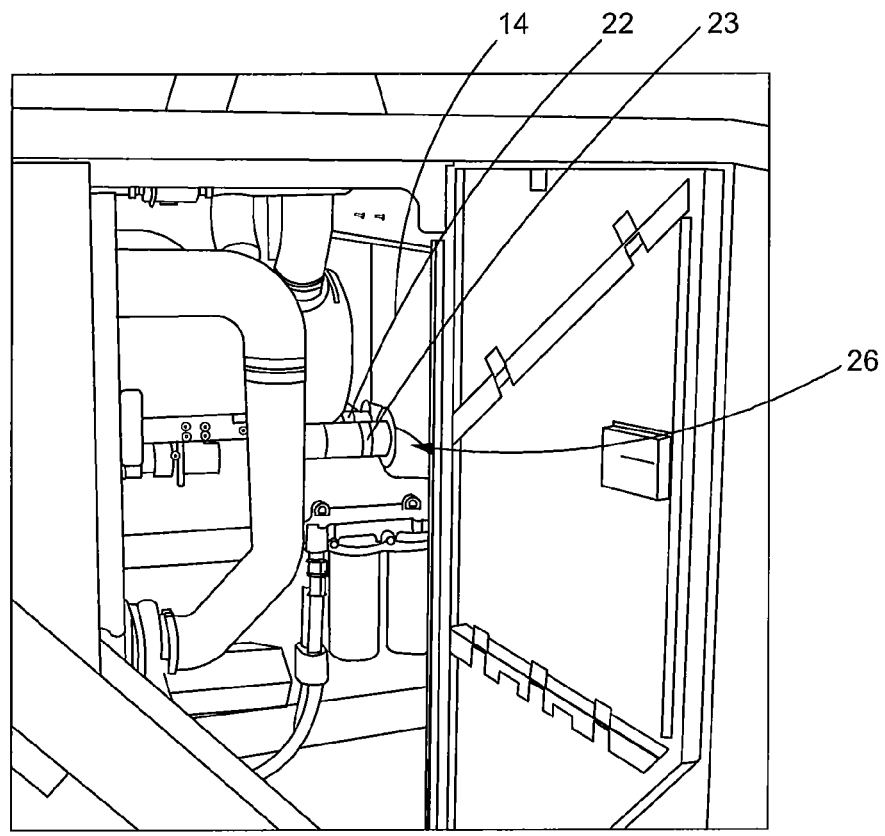
FIG. 2 is a perspective view of the engine enclosure shown in FIG. 1 further illustrating two air ducts passing through the sound wall between the engine enclosure and cooling system enclosure.

Referring to FIGS. 1-2, a pair of ducts 22, 23 (see FIG. 2) pass through the sound wall 14. The ducts 22, 23 may be used for the communication of air between the enclosures 12, 13. For example, if the machine 10 includes a turbo charger system for the engine (not shown), it may be desirable to cool the exhaust gases after the exhaust gases are compressed by a compressor (not shown) before the exhaust gases are recirculated back into the engine intake manifold (also not shown). Thus, it may be desirable to install a heat exchanger 24 in the cooling system enclosure 13 as shown in FIG. 1. The duct 23 as shown in FIG. 1 may serve as an intake or an outlet for the heat exchanger 24 and, hence, the gases flowing through the duct 23 may flow in either direction as indicated by the double ended arrow 25 shown in FIG. 1. The perspective view of FIG. 2 illustrates that it may be common for a pair of ducts 22, 23 to be utilized where separate exhaust streams are recirculated back to either side of the engine block (not shown). Hence, it may be common for a pair of ducts 22, 23 as shown in FIG. 2 to pass through the sound wall 14.

As noted above, the fan 16 creates a substantial pressure drop across the radiator 15 and the cooling system enclosure 13. As a result, the sound wall 14 may move or flex from its relaxed position. Further, the grommet and seal assembly 26 may become dislodged from the sound wall 14 thereby creating a gap between the ducts 22, 23 and the sound wall 14. Any gap between the ducts 22, 23 and the sound wall 14 may result in hot air flowing from the engine enclosure 12, through any gaps between the sound wall 14 and the ducts 22, 23 and into the cooling system enclosure 13. Because air within the engine enclosure 12 is hot due to the operation of the engine and related components, the transmission of hot air from the engine enclosure 12 across the radiator 15 in competition with the ambient air drawn into the enclosure 13 by the fan 16, will reduce the efficiency of the cooling system 27. In short, the efficiency of the cooling system 27 will be higher if ambient air is drawn from outside the machine 10 by the fan (see the phantom lines 17) than if hot air from the engine enclosure 12 is permitted to flow across the radiator 15 in addition to ambient air. To eliminate the possibility of hot air from the engine enclosure 12 passing through the sound wall 14 and across the radiator 15, an improved grommet and seal assembly 26 is disclosed and will be described in detail in connection with FIGS. 3-6.

Figure 3:
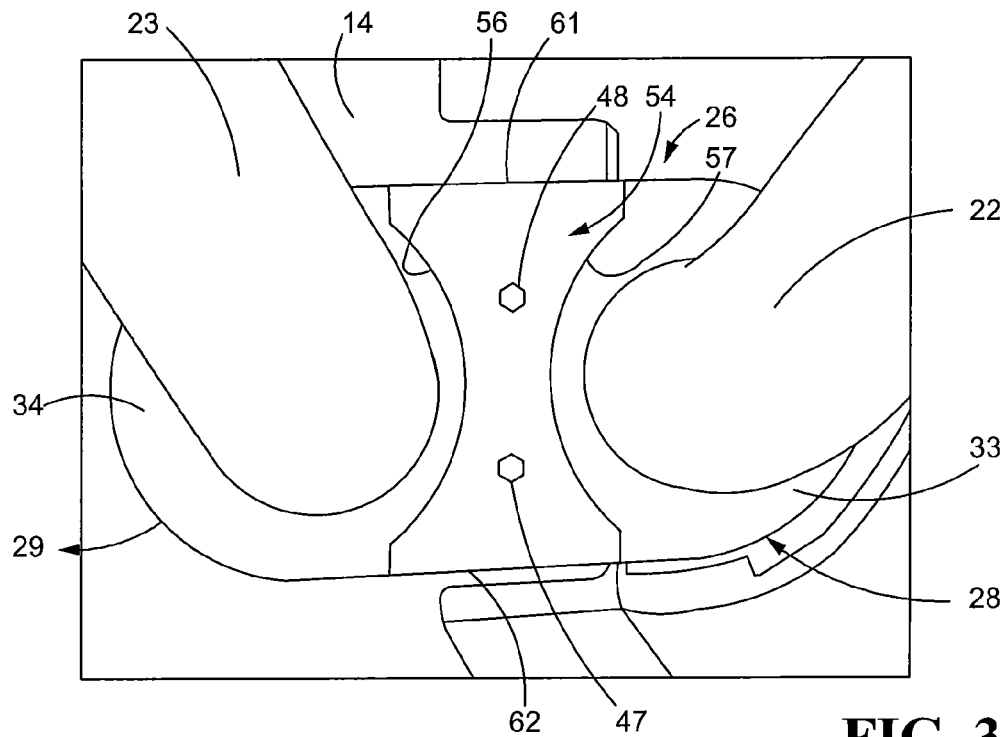
FIG. 3 is a plan view of a disclosed grommet and seal assembly, air ducts and sound wall.
Figure 4:
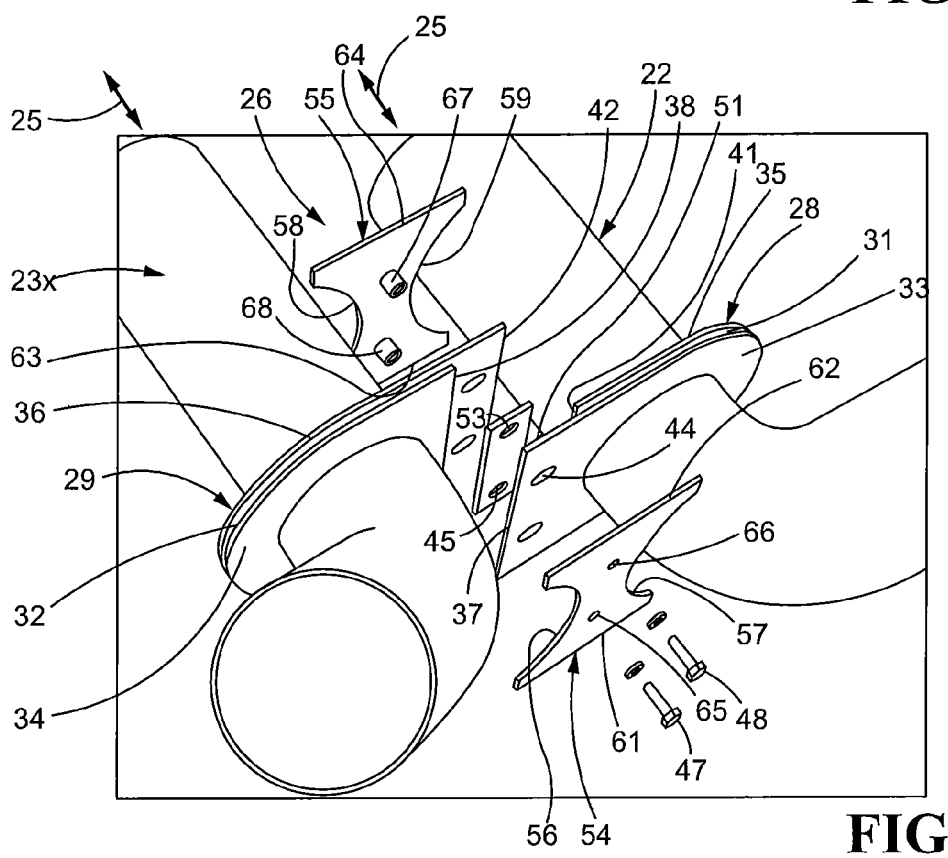
FIG. 4 is an exploded view of the grommet and seal assembly and air ducts shown in FIG. 3 with the sound wall removed.
Figure 5:
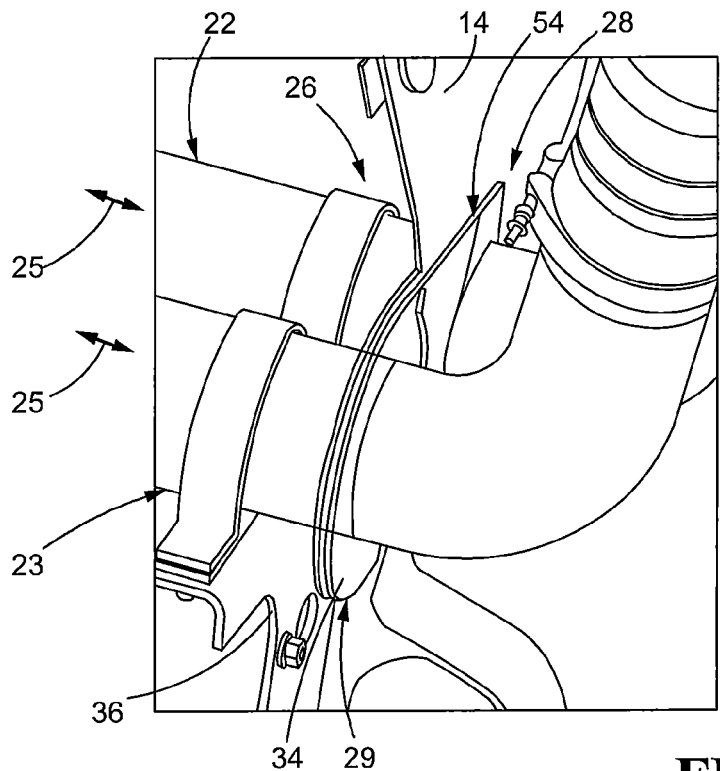
FIG. 5 is a partial perspective view of the disclosed grommet and seal assembly and air ducts shown in FIGS. 3-4, with a portion of the sound wall removed.
Figure 6:
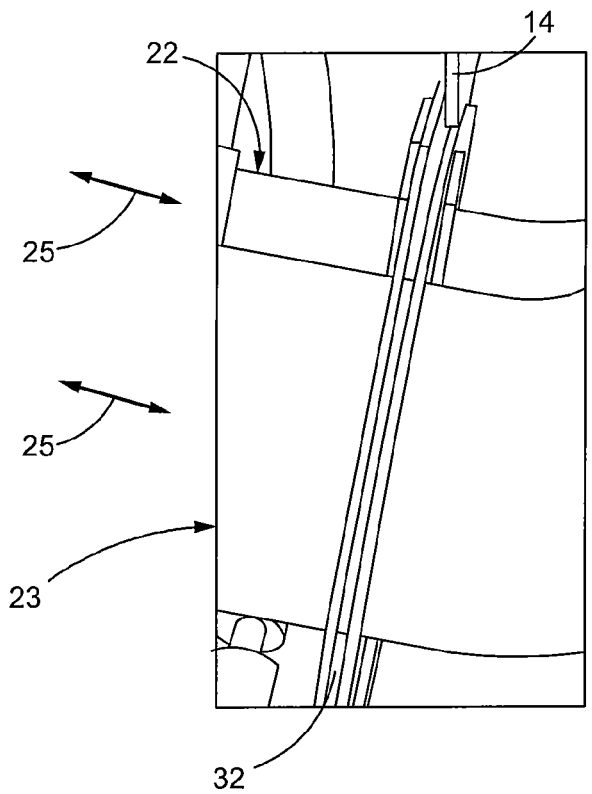
FIG. 6 is another side perspective view of the disclosed grommet and seal assembly and air ducts with the sound wall removed.
Figure 7:
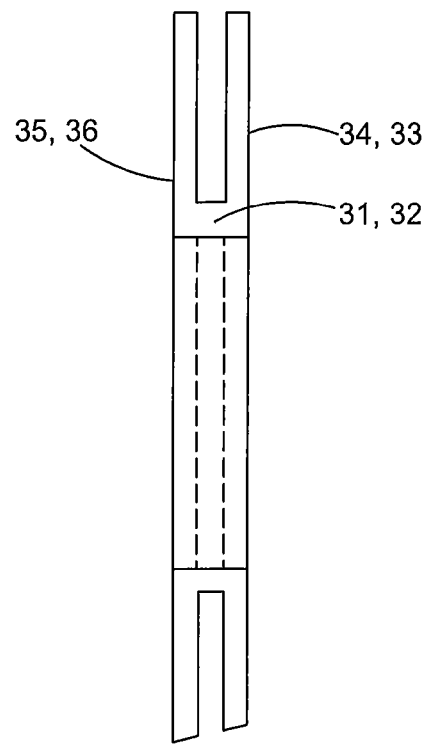
FIG. 7 is a sectional view of the disclosed flexible grommets.
Figure 8:
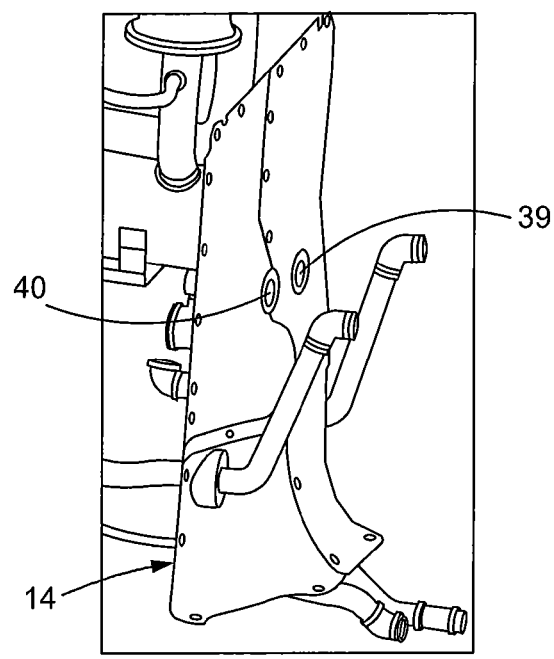
FIG. 8 is a perspective view of the sound wall with the air ducts removed thereby illustrating the openings in the sound wall through which the air ducts and flexible grommets pass.

Turning to FIGS. 3-4, the disclosed grommet and seal assembly 26 may include a pair of flexible grommets 28, 29. The flexible grommets 28, 29 may each include a cylindrical section 31, 32 with the best view of the cylindrical section 31, 32 shown in FIG. 7. As shown in FIGS. 5-8, the ducts 22, 23 and the cylindrical sections 31, 32 of the flexible grommets 28, 29 pass through a pair of openings 39, 40 in the sound wall 14. Further, each cylindrical section 31, 32 includes a proximal end that may be connected or coupled to a proximal flange 33, 34 and a distal end that may be coupled to a distal flange 35, 36 as shown in FIG. 4. As shown in FIGS. 5 and 7, the proximal flanges 33, 34 and the distal flanges 35, 36 extend radially outwardly from the cylindrical sections 31, 32 respectively and provide a gap for accommodating the sound wall 14. Thus, the sound wall 14 is sandwiched between the proximal and distal flanges 33, 35 of the flexible grommet 28 as well as between the proximal and distal flanges 34, 36 of the flexible grommet 29.

The flexible grommets 28, 29 may be fabricated from a flexible material, such as a polymer. Suitable polymers include silicones because of their rubber-like qualities and good heat resistance. Silicones also provide low thermal conductivity as well as thermal stability. However, because they are flexible, the flexible grommets 28, 29 may move in the event the sound wall 14 flexes. Thus, the disclosed grommet and seal assembly 26 may also include features for enhancing the structural integrity of the flexible grommets 28, 29.

For example, referring to the proximal flanges 33, 34 as shown in FIG. 4, each proximal flange 33, 34 includes a side edge 37, 38 respectively that are disposed between the openings in the sound wall 14 or between the ducts 22, 23 as shown in FIG. 4. Similarly, each distal flange 35, 36 may also include a side edge 41, 42 disposed between the openings in the side wall or between the ducts 22, 23 as shown in FIG. 4. Further, the side edges 37, 38 abut one another and the side edges 41, 42 also abut one another. Still further, the side edges 37, 38 may also be disposed in an offset position with respect to the side edges 41, 42.

To further enhance the structural integrity of the grommet and seal assembly 26, the flexible grommets 28, 29 may be coupled together. One means for coupling the grommets 28, 29 together is shown in FIG. 4 which includes coupling the proximal flange 33 of the flexible grommet 28 to the distal flange 36 of the flexible grommet 29. Specifically, the proximal flange 33 of the flexible grommet 28 includes a pair of openings 43, 44 and the distal flange 36 of the flexible grommet 29 may also include a pair of openings 45, 46 for receiving the fasteners 47, 48. To further enhance the structural stability of the grommet and seal assembly 26, a middle plate 51 may also be employed which may be fabricated from a rigid material, such as a metal or another suitable rigid material that is also heat resistant, such as a ceramic, graphite or rigid plastic material.

The middle plate 51 may also include openings 52, 53 that are in registry with the openings 43, 45 and 44, 46 respectively for receiving the fasteners 47, 48. Still referring to FIG. 4, the disclosed grommet and seal assembly 26 may also include a proximal plate 54 and a distal plate 55. The proximal and distal plates 54, 55 may each include inwardly curved side 56, 57 and 58, 59 that are disposed between opposing ends 61, 62 and 63, 64 respectively. In other words, the proximal and distal plates 54, 55 may be hour glass shaped as shown in FIG. 4. The proximal and distal plates 54, 55 may also include openings such as those shown at 65, 66 for receiving the fasteners 47, 48.

It will be noted that the distal plate 55 as shown in FIG. 4 includes a pair of sockets 67, 68 for accommodating the threaded fasteners 47, 48. Thus, the threaded fasteners 47, 48 couple the proximal and distal plates 54, 55 together thereby sandwiching the proximal flanges 33, 34, the middle plate 51, and the distal flanges 35, 36 between the proximal and distal plates 54, 55. The hour glass configuration of the proximal and distal plates 54, 55 renders them particularly suitable for coupling two flexible grommets 28, 29 together that accommodate two closely spaced-apart ducts 22, 23. Further, the offset between the pairs of side edges 37, 38 and 41, 42 enables the placement of the middle plate 51 between all four side edges 37. 38, 41, 42, which adds further structural rigidity to the grommet and seal assembly 26.

INDUSTRIAL APPLICABILITY

The disclosed grommet and seal assembly 26 may be incorporated as a part of an overall sound attenuation system that includes a sound wall 14 with a pair of openings in the sound wall for accommodating a pair of ducts 22, 23. The disclosed grommet and seal assembly 26 provides flexible grommets 28, 29 that provide an effective seal between the outer surfaces of the ducts 22, 23 and the sound wall openings (not shown). The flexible grommets 28, 29 are held in place in the event the sound wall 14 flexes or moves by an additional grommet system in the form of the proximal and distal plates 54, 55 which may be coupled together through the grommets 28, 29 by a pair of fasteners 47, 48. While two fasteners 47, 48 are shown, it will be apparent to one skilled in the art that as few as one fastener or more than two fasteners may be employed. Further, for additional structural integrity, a middle plate 51 may also be employed. If a middle plate 51 is employed, the flanges 33-36 may be overlapped and offset in the following manner. Specifically, the proximal flanges 33, 34 may meet at side edges 37, 38 while the distal flanges 35, 36 may also meet at side edges 41, 42. However, the pairs of abutting side edges 37, 38 and 41, 42 may be offset from one another and the middle plate 51 may be disposed between the pairs of offset side edges 37, 38 and 41, 42 as illustrated in FIG. 3. The threaded fasteners 47, 48 may be secured in place by bolts or sockets 67, 68 which may be secured to one of the plates 54 or 55.

A method for passing air through the sound wall 14 via the first and second air ducts 22, 23 without permitting air to pass from the engine enclosure 12 to the cooling system enclosure 13 is also disclosed. The disclosed method may include installing the grommet 28 in the opening 39 in the sound wall 14 (see FIG. 8) and installing the flexible grommet 29 in the opening 40 in the sound wall 14 and passing the first duct 22 through the first grommet 28 and installing the second duct 23 through the second grommet 29. The installing of the first and second grommets 28, 29 may also include arranging the abutting side edges 37, 38 and 41, 42 so that they are offset from one another as illustrated in FIG. 4. The method may further include placing a distal plate over the proximal side edges 37, 38, placing a distal plate or the distal side edges 41, 42 and coupling the proximal and distal plates 54, 55 together. As noted above, a middle plate 51 may be employed between the offset side edges 37, 38 and 41, 42.

What is claimed is:

1. A sound attenuation system, comprising:
   a sound wall with a first opening disposed adjacent to but spaced apart from a second opening;

the first opening accommodating a first duct and a first grommet, the second opening accommodating a second duct and a second grommet;

the first grommet including a first cylindrical section that passes through the first opening and that accommodates the first duct, the first cylindrical section including a proximal end connected to a proximal flange, the first cylindrical section further including a distal end connected to a distal flange with the sound wall disposed between the proximal and distal flanges of the first grommet;

the second grommet including a second cylindrical section that passes through the second opening and that accommodates the second duct, the second cylindrical section including a proximal end connected to a proximal flange, the second cylindrical section further including a distal end connected to a distal flange with the sound wall disposed between the proximal and distal flanges of the second grommet;

the proximal flange of the first grommet including a proximal side edge disposed between the first and second openings, the proximal flange of the second grommet also including a proximal side edge disposed between the first and second openings and that abuts the proximal side edge of the first grommet;

the distal flange of the first grommet including a distal side edge disposed between the first and second openings, the distal flange of the second grommet also including a distal side edge disposed between the first and second openings and that abuts the distal side edge of the first grommet;

the proximal side edges of the first and second grommets being disposed between the sound wall and a proximal plate, the distal side edges of the first and second grommets being disposed between the sound wall and a distal plate; and the proximal and distal plates being coupled together with the proximal side edges, distal side edges and sound wall sandwiched therebetween.

2. The sound attenuation system of claim 1 wherein the proximal and distal plates each include sides that extend between opposing ends and that are curved inwardly towards each other.

3. The sound attenuation system of claim 1 wherein the proximal and distal plates are hourglass shaped.

4. The sound attenuation system of claim 1 wherein the proximal and distal plates are coupled together by a fastener.

5. The sound attenuation system of claim 4 wherein the fastener passes through the sound wall and the proximal and distal plates.

6. The sound attenuation system of claim 1 wherein the proximal and distal plates are coupled together by a pair of fasteners.

7. The sound attenuation system of claim 6 wherein the pair fasteners pass through the sound wall and the proximal and distal plates.

8. The sound attenuation system of claim 1 wherein the proximal side edges of the first and second grommets are offset from the distal side edges of the first and second grommets.

9. The sound attenuation system of claim 1 further including a center plate disposed between the proximal side edges of the first and second grommets and the distal side edges of the first and second grommets.

10. The sound attenuation system of claim 9 further including at least one fastener that couples the proximal plate to the distal plate and that passes through the center plate.

11. The sound attenuation system of claim 9 further including a pair fasteners that couple the proximal plate to the distal plate and that pass through the center plate.

12. A reinforcing grommet for supporting a pair of flexible grommets disposed adjacent to but spaced apart from each other, the flexible grommets each including proximal and distal flanges, the proximal flanges each including proximal side edges that abuttingly engage each other and the distal flanges each including distal side edges that abuttingly engage each other at a position offset from the proximal side edges, the reinforcing grommet comprising:
    a proximal plate for overlying the proximal side edges and a distal plate for overlying the distal side edges; and
    at least one fastener connecting the proximal plate to the distal plate with the proximal side edges and the distal side edges of the flexible grommets disposed therebetween.

13. The reinforcing grommet of claim 12 wherein the proximal and distal plates each include sides that extend between opposing ends and that are curved inwardly towards each other.

14. The reinforcing grommet of claim 12 wherein the proximal and distal plates are hourglass shaped.

15. The reinforcing grommet of claim 12 wherein the proximal and distal plates are coupled together by a pair of fasteners.

16. The reinforcing grommet of claim 12 wherein the proximal side edges of the flexible grommets are offset from the distal side edges of the flexible grommets.

17. The reinforcing grommet of claim 12 further including a center plate disposed between the proximal side edges and the distal side edges of the flexible grommets.

18. The reinforcing grommet of claim 17 wherein the at least one fastener that couples the proximal plate to the distal plate also passes through the center plate.

19. The reinforcing grommet of claim 17 wherein at least one fastener includes a pair fasteners that couple the proximal plate to the distal plate and that also pass through the center plate.

20. A method for passing air through a sound wall that divides a first enclosure from a second enclosure, the air passing through the sound wall via first and second air ducts that pass through first and second openings in the sound wall without permitting air to pass between the first and second enclosures through the first and second openings and outside of the first and second air ducts, the method comprising:
    installing a first grommet in the first opening and passing the first duct through the first grommet, the first grommet including a first cylindrical section that passes through the first opening and that accommodates the first duct, the first cylindrical section including a proximal end connected to a proximal flange, the first cylindrical section further including a distal end connected to a distal flange with the sound wall disposed between the proximal and distal flanges of the first grommet, the proximal flange of the first grommet including a proximal side edge disposed between the first and second openings, the distal flange of the first grommet including a distal side edge disposed between the first and second openings;
    installing a second grommet in the second opening and passing the second duct through the second grommet, the second grommet including a second cylindrical section that passes through the second opening and that accommodates the second duct, the second cylindrical section including a proximal end connected to a proximal flange, the second cylindrical section further including a distal end connected to a distal flange with the sound wall disposed between the proximal and distal flanges of the second grommet, the proximal flange of the second grommet also including a proximal side edge disposed between the first and second openings and that abuts the proximal side edge of the first grommet, the distal flange of the second grommet also including a distal side edge disposed between the first and second openings and that abuts the distal side edge of the first grommet;

placing a proximal plate over the proximal side edges of the first and second grommets so the proximal side edges are disposed between the sound wall and the proximal plate;

placing a distal plate over the distal side edges of the first and second grommets so the distal side edges are disposed between the sound wall and the distal plate; and coupling the proximal and distal plates together with the proximal side edges, distal side edges and sound wall sandwiched therebetween.

\* \* \* \* \*